UNITED STATES PATENT OFFICE.

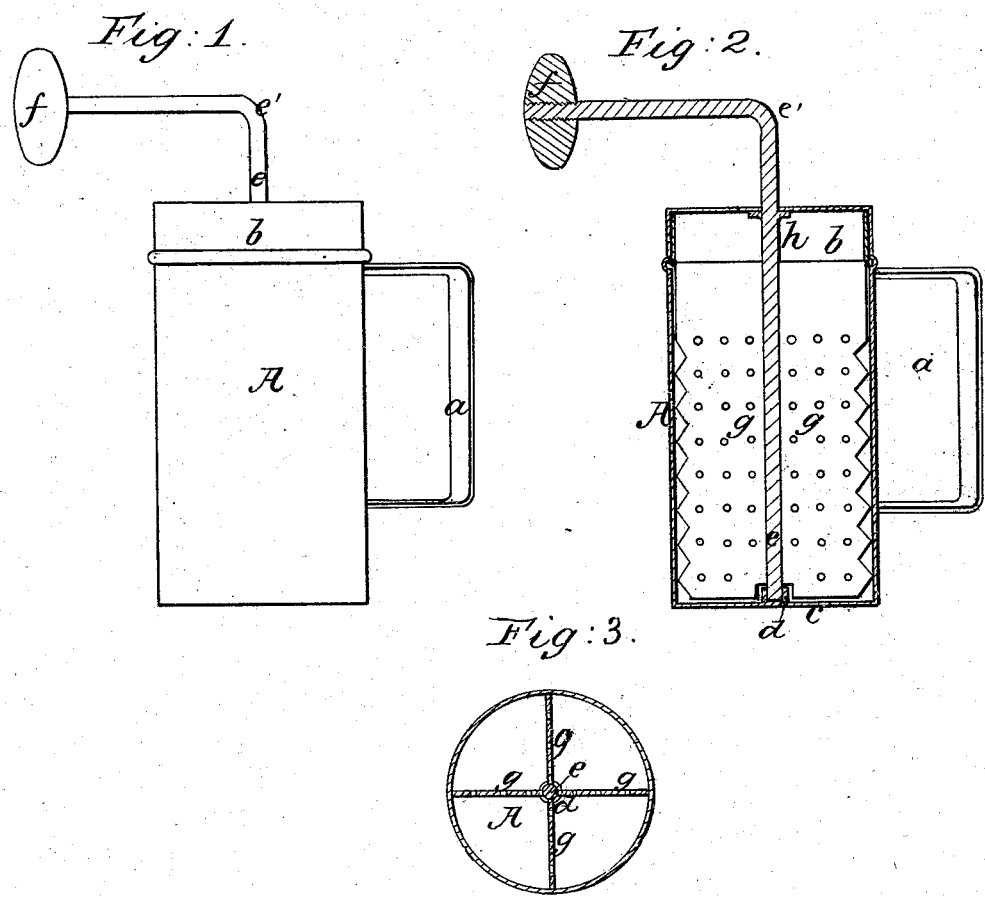
Pangborn & Griffin,
Egg-Beater,
No. 54,761. Patented May 15, 1866.

S. B. PANGBORN AND G. H. GRIFFIN, OF BOSTON, MASSACHUSETTS.

IMPROVED EGG-BEATER.

Specification forming part of Letters Patent No. 54,761, dated May 15, 1866.

*To all whom it may concern:*

Be it known that we, SAMUEL B. PANGBORN and GEORGE H. GRIFFIN, of Boston, in the county of Suffolk and State of Massachusetts, have invented an Improved Egg-Beater; and I do hereby declare the same to be fully described in the following specification and represented in the accompanying drawings, of which—

Figure 1 is a side elevation, Fig. 2 a vertical section, and Fig. 3 a horizontal section, of it.

In such drawings, A denotes a pot or cylindrical vessel, provided with a handle, $a$, to extend from its side, and also a cap or cover, $b$, to close on and cover its mouth or open end.

At the center of the bottom $c$ of the vessel is a step, $d$, to receive the point or lower end of a vertical shaft, $e$, which extends up through the vessel and through the central part of the cover, and thence is bent at right angles, or thereabout, as shown at $e'$, and has a ball or weight, $f$, applied to its outer end.

The shaft is to be capable of being freely revolved in the step and in the hole in the cover, and is to be provided with a series of wings or beaters, $g\ g\ g$, extended from it radially within the case. If desirable, these wings may be serrated on their edges and be perforated with holes.

When the yelks and albuminous portions of eggs are in the vessel and the cap or cover is put in place, we have, in order to effect the beating of the yelks and albuminous parts together only to lay hold of the handle and impart to the box slight quick movements, such as will cause the weight to spin around in a circle and set the shaft and its beaters in rapid revolution within the pot or vessel.

In order to prevent the liquid from being ejected through the shaft-opening of the cover, a small disk or guard, $h$, is fixed concentrically to the shaft close to the cover.

Should any liquid get between the disk and the cover it will be thrown by centrifugal force in a direction away from the shaft, and thus will be prevented from escaping through the shaft-hole.

We claim—

1. The improved egg-beater as composed of the vessel or pot A, the shaft $e$, and its wings or beaters $g\ g\ g$, and the arm or projection $e'$, and the weight $f$ fixed to such arm, the whole being arranged in manner and so as to operate substantially as and for the purpose as hereinbefore specified.

2. The combination of the centrifugal guard $h$ with the vessel A and its cover, and with the shaft, its beaters, and the arm and weight applied to such vessel, the whole being substantially as specified.

SAMUEL B. PANGBORN.
GEO. H. GRIFFIN.

Witnesses:
R. H. EDDY,
F. P. HALE, Jr.